(12) United States Patent
Levy

(10) Patent No.: US 8,601,489 B2
(45) Date of Patent: Dec. 3, 2013

(54) AUTOMATED COMPUTER SYSTEMS EVENT PROCESSING

(75) Inventor: David D. Levy, Conyers, GA (US)

(73) Assignee: BMC Software, Inc., Houston, TX (US)

( * ) Notice: Subject to any disclaimer, the term of this patent is extended or adjusted under 35 U.S.C. 154(b) by 535 days.

(21) Appl. No.: 12/641,155

(22) Filed: Dec. 17, 2009

(65) Prior Publication Data

US 2011/0154362 A1     Jun. 23, 2011

(51) Int. Cl.
G06F 3/00      (2006.01)
G06F 9/44      (2006.01)
G06F 9/46      (2006.01)
G06F 13/00     (2006.01)

(52) U.S. Cl.
USPC ......................................................... 719/313

(58) Field of Classification Search
USPC ......................................................... 719/313
See application file for complete search history.

(56) References Cited

U.S. PATENT DOCUMENTS

| 5,477,474 | A * | 12/1995 | Southgate et al. ............... 703/15 |
| 6,120,552 | A * | 9/2000 | Kurtzberg et al. ............ 717/142 |
| 6,631,363 | B1 * | 10/2003 | Brown et al. ................. 719/318 |
| 2002/0120711 | A1 * | 8/2002 | Bantz et al. .................... 709/217 |
| 2004/0088650 | A1 * | 5/2004 | Killen et al. ................... 715/503 |
| 2008/0312928 | A1 * | 12/2008 | Goebel et al. ................. 704/255 |

* cited by examiner

Primary Examiner — Tuan Dao
Assistant Examiner — Timothy A Mudrick

(57) ABSTRACT

Systems and methods for automated computer systems event processing are described herein. At least some example embodiments include a communication interface that receives an event message and a processing unit (coupled to the communication interface) that processes the event message and that further obtains, parses and tokenizes an character string that includes one or more delimited elements selected from the group consisting of a constant, a variable and a function, wherein each function accepts as input the one or more delimited elements. The processing unit further evaluates the parsed and tokenized character string in response to receiving the event message and initiates an action based upon the result of the evaluation. The processing unit also creates a common execution environment for performing the processing, obtaining, parsing, tokenizing and evaluation.

34 Claims, 8 Drawing Sheets

AUTOMATED COMPUTER SYSTEMS EVENT PROCESSING

BACKGROUND

This disclosure relates generally to the automation of computer systems event processing. Today's datacenters house increasingly large numbers of computers, each of which may be physically and/or logically partitioned, with each partition being subdivided even further using any of a number of virtualization technologies. For example, a mainframe computer such as the IBM System z10® can support up to 60 logical partitions (LPARs), each of which can support hundreds of z/VM® virtual machine images, each executing its own operating system (e.g., z/Linux). (System z10 and z/VM are registered trademarks of the International Business Machines Corporation.) As a result, a single datacenter may need to support thousands, if not tens of thousands, of real and/or virtual machines, each of which represents a source of events that must be monitored, interpreted and possibly acted upon.

To cope with the volume of information generated by so many event sources, a number of software applications have been developed to centralize the monitoring and processing of datacenter events. For example, the MAINVIEW® software suite, allows a datacenter such as that described above to be managed using a single set of management rules for the entire datacenter. (MAINVIEW is a registered trademark of BMC Software, Inc.) Any event may have one or more discrete "rules" that define a set of automated tasks to be executed if the event occurs in the portion of the datacenter actively monitored and managed by the management station. Event notifications are forwarded to a management station by the originating system to be categorized, filtered and presented to an automation engine that may take action in response to the event based upon one or more pre-programmed criteria (e.g., number of events per minute or the severity of the event).

If incoming events match the criteria of an established automation rule, the events or event sequences may be handled automatically by the software, rather than presented to an operator for action. Software packages such as BMC's MAINVIEW AutoOPERATOR provide the capability of identifying one or more conditions that trigger the execution of preprogrammed responses. More complex processing of events, however, require the use of command procedures such as CLIST and REXX. Such command procedures may be launched by programs such as AutoOPERATOR based on the aforementioned trigger conditions, and these procedures may then perform more complex combinations and calculations based on a wide variety of events and event sequences to determine if a preprogrammed response is warranted.

The use of command procedures, however, incurs a significant processing overhead penalty. Such procedures are launched as separate, stand-alone processes that subsequently communicate with the very same software that launched the procedure to retrieve the information the procedure needs. Further, creating the command procedures require the skills of a proficient programmer familiar with the command procedure language and with the functions that must be invoked to access the needed information from the event processing software. It would be desirable to perform all such processing within the event processing software itself, and to provide an interface that allows a user to describe the desired processing of events without having to be proficient at coding and using command procedures or any other high-level computer programming language.

SUMMARY

Systems and methods for automated computer systems event processing are described herein. At least some example embodiments include a communication interface that receives an event message and a processing unit (coupled to the communication interface) that processes the event message and that further obtains, parses and tokenizes a character string that includes one or more delimited elements selected from the group consisting of a constant, a variable and a function (wherein each function accepts as input the one or more delimited elements). The processing unit further evaluates the parsed and tokenized character string in response to receiving the event message and initiates an action based upon the result of the evaluation. The processing unit also creates a common execution environment for performing the processing, obtaining, parsing, tokenizing and evaluation.

Other illustrative embodiments include a method for processing events from a plurality of computer systems that includes a management station, the method including receiving and processing an event message by the management station and obtaining a character string by the management station (the character string including one or more delimited elements selected from the group consisting of a constant, a variable and a function, wherein each function accepts as input the one or more delimited elements), parsing and tokenizing the character string by the management station. The method further includes evaluating the parsed and tokenized character string by the management station to generate a result and initiating an action by the management system based on the result. The processing and evaluating are performed in response to the act of receiving. A common execution environment is created at the management station for performing the acts of processing, obtaining, parsing, tokenizing and evaluating. Still other illustrative embodiments include a computer-readable storage medium that includes software that can be executed on a processor to cause the processor to perform the above-described method.

Yet other illustrative embodiments include a networked computer system that includes one or more monitored systems each configured to transmit one or more event messages a communication network that couples the one or more monitored systems to each other, and a computer system for processing events that is coupled to the communication network. The computer system includes a communication interface that receives an event messages of the one or more event messages and a processing unit (coupled to the communication interface) that processes the event message and that further obtains, parses and tokenizes a character string comprising one or more delimited elements selected from the group consisting of a constant, a variable and a function (wherein each function accepts as input the one or more delimited elements). The processing unit further evaluates the parsed and tokenized character string in response to receiving the event message and initiates an action based upon the result of the evaluation. The processing unit also creates a common execution environment for performing the processing, obtaining, parsing, tokenizing and evaluation.

DETAILED DESCRIPTION

Figure 1A:
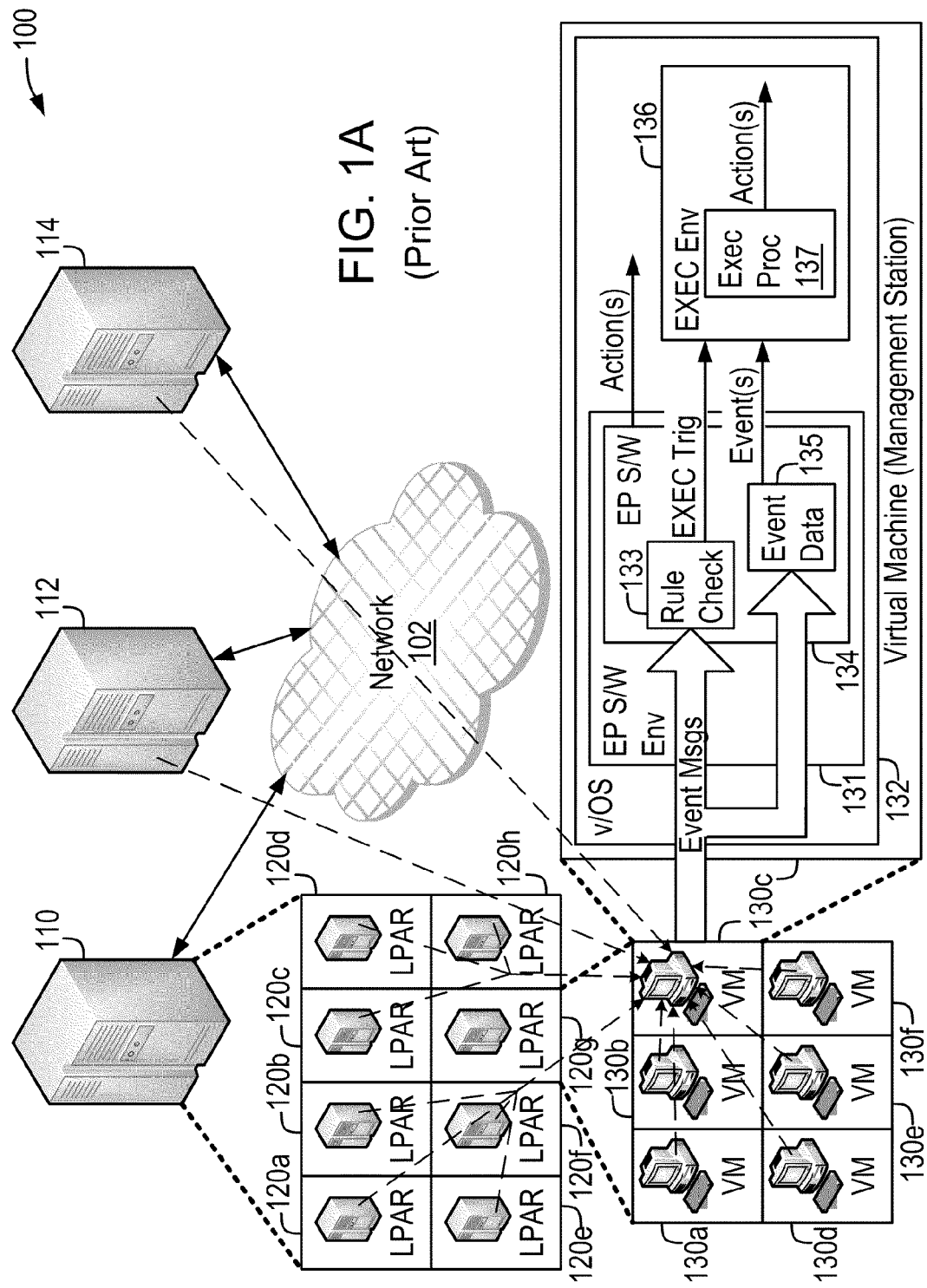
FIGS. 1A and 1B illustrate a prior art system and method for automated processing of events.

The present disclosure describes systems and methods for automated computer systems event processing. In order to better understand how the disclosed systems and methods function, it is useful to review how such processing is implemented in existing, prior art systems, an example of which is shown in FIG. 1A. System 100 includes mainframe computer systems 110, 112 and 114, each of which represents a potential source of events. Such events may include security events (e.g., successful logins and login failures), hardware events (e.g., a hard disk failure) and program execution events (e.g., program execution start and end dates and times), just to name a few examples. Mainframe 110 further shows an example of how such mainframes may be subdivided into logical partitions (LPARs) 120a-120h. Each partition may subsequently operate as a host system for one or more guest virtual machines, such as virtual machines (VMs) 130a-130f hosted on logical partition 120g.

All of the mainframes, logical partitions and virtual machines each represent a potential source of events, which are routed to a single management station. In the example of FIG. 1A, the flow of event messages are represented by the dashed arrows originating from the various event sources, which are all directed to a management station implemented using virtual machine 130c. Although a virtual machine is used to host the management station function in the example shown, any of a number of real or virtual host machines may be used (e.g., a personal computer or a stand-alone UNIX workstation), and all such host machines are contemplated by the present disclosure.

Figure 1B:
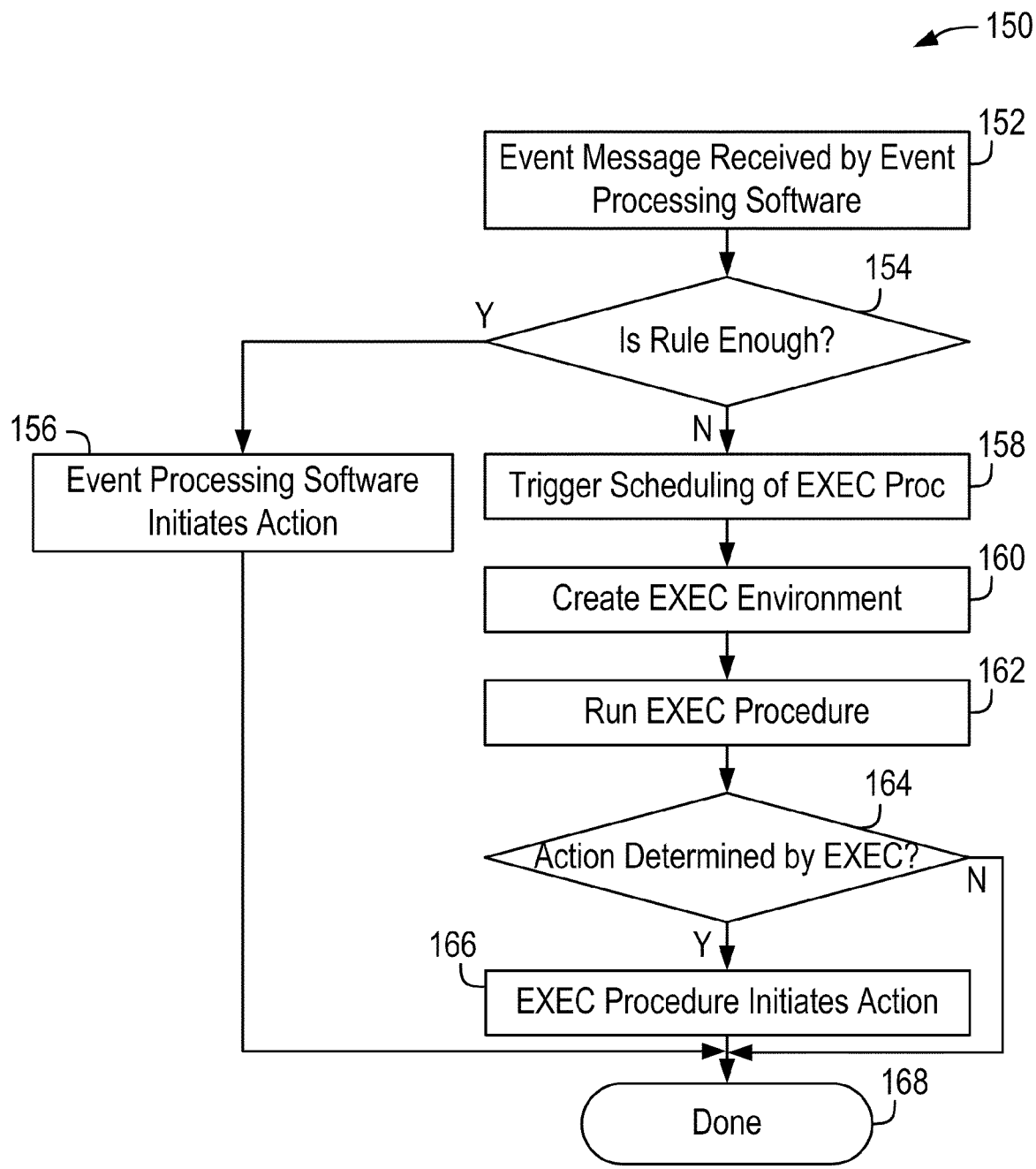

FIG. 1A further shows the organization of the software executing on virtual machine 130c, including virtual operating system (v/OS) 132, which provides the operating environment for executing software processes (e.g., event processing software (EP S/W) 134) used to implement at least some of the management station functionality. Referring now to both system 100 of FIG. 1A and method 150 of FIG. 1B, event processing software 134 receives event messages from the various event sources (block 152 of method 150), which are processed by rule check module 133 and stored as event data 135. As already noted, the rule checking provided may be somewhat limited, given that the capabilities provided are generally hard-coded as specific options that may be selected for identifying an event as an event of interest. Thus, for example, a rule may be defined that detects the occurrence of a certain type of error with a particular error code. If the rule provides enough of a selection criteria to decide whether an action need be taken (block 154), event processing software 134 initiates the required action (block 156). For example, if a processor ventilation fan within one of the mainframes fails, the action may be to immediately signal a high priority visual and audible alarm at the operator console so that additional action may be taken (e.g., to restart/reschedule on another processor tasks executing on the processor with the failed fan and to make the processor with the failed fan unavailable for further task scheduling).

If the rule does not provide enough of a selection criteria (block 154) and more complex combinations or calculations are needed (e.g., calculating an error rate and triggering an action if the rate is exceeded), the occurrence of the error triggers the scheduling of an EXEC procedure (block 158), which results in the creation of EXEC environment 136 (block 160) within which EXEC procedure 137 is run (block 162). This process execution environment is separate from the environment created for the event processing software (EP S/W Env 132). EXEC procedure 137 may access event data 135 in order to perform calculations on, and combinations of, data based on one or more event messages or event message sequences. For example, if action depends upon whether an error rate is exceeded, the occurrence of the error causes an error counter to be incremented and a time calculation to be performed to determine the amount of transpired time since the error counter was last reset. The number of errors is then divided by the transpired time to determine an error rate. If the EXEC procedure determines that an action is required (block 164), for example, if the error rate exceeds a threshold error rate, the EXEC procedure initiates the required action (block 166) and the EXEC procedure ends execution (block 168). If no action is required (block 164), the EXEC procedure also ends (block 168).

From the above it is evident that whenever a rule defined within system 100 fails to provide a selection criterion that is sufficient to determine whether an action is required, an EXEC procedure (or other similar command procedure) must be executed in order to make that determination. This is true even if the command procedure determines that no action is required. Thus, if a rule does not provide an adequate selection criterion (which may occur as much as 40% of the time in at least some existing systems), a command procedure execution must be scheduled, an execution environment created, and the command procedure executed each time the rule proves to be inadequate. As a result, significant overhead and system resources are utilized just to determine if an action is required in response to an event.

Figure 2A:
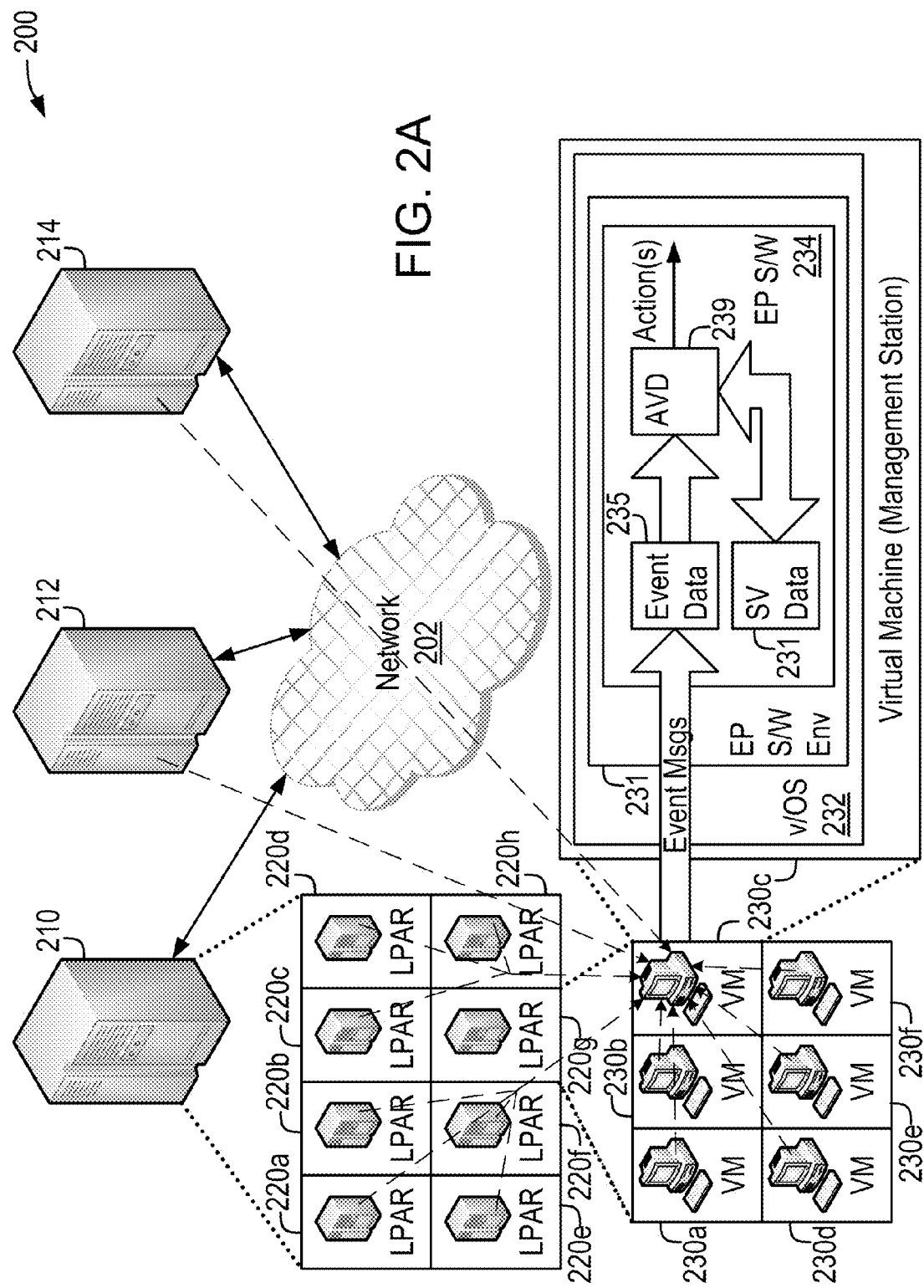
FIGS. 2A and 2B illustrate an example system and method for automated processing of events, in accordance with at least some embodiments.

FIG. 2A illustrates an alternative system 200, in accordance with at least some embodiments incorporating the claimed subject matter. The organization of the mainframes 210, 212 and 214, logical partitions 220a-220h and virtual machines 230a-230f are similar to that of the corresponding elements of FIG. 1A. Event messages also flow from the various sources to the management station (VM 230c) and are stored as event data 235 in a manner similar to that shown in FIG. 1A. Software processes are similarly executed within the operating environment provided by virtual operating system (v/OS) 232, which creates the required execution environment for each parent process upon its execution.

Event processing software 234 of FIG. 2A, however, includes shared variable data (SV Data) 231 and advanced variable dependency (AVD) module 239. As is described in more detail below, AVD module 239 enables one or more event messages to be operated upon using equations that include complex logical and/or mathematical operations, thus determining if an action is required. Further, the results of such operations may be stored as a shared variable and accessed by AVD module 239 when applying other equations, thus allowing equations to accept as input the results of other equations. Also, as is evident from FIG. 2A, all of the operations and calculations take place within the same process execution environment as event processing software 234 (e.g., event processing software environment (EP S/W Env)

231), thus avoiding the overhead associated with triggering the execution of a command procedure and the creation of a separate process execution environment for the command procedure. Each task performed by AVD module 239 is performed within the same task execution environment created by the execution of event processing software 234 if it is the parent process, or by the execution of another process acting as the parent to both event processing software 234 and AVD module 239. This is the case even if AVD module 239 is implemented as multiple separate modules.

Figure 2B:
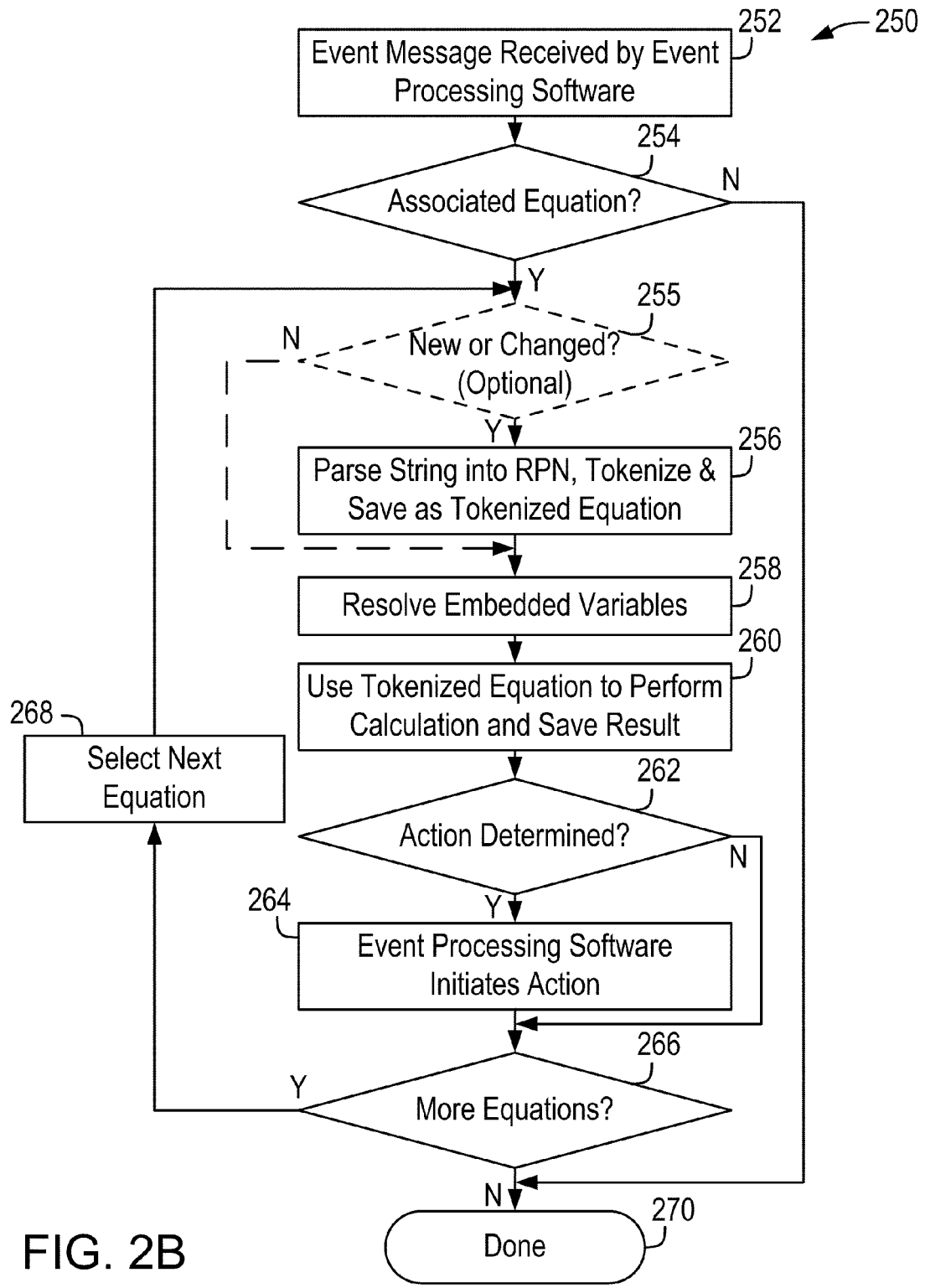

Referring now to both example system 200 of FIG. 2A and example method 250 of FIG. 2B, when an event message is received by event processing software 234 (block 252 of method 250) the event message is saved as part of event data 235 and presented to AVD module 239. AVD module 239 then determines if the event is associated with an equation. In at least some illustrative embodiments, a character string encoded, e.g., as an EBCDIC string represents a user-defined equation designed to perform a calculation in response to an event. The character string is parsed and tokenized to produce a tokenized equation that is subsequently used to determine the equation result. This result is used to determine if an action should be initiated in response to the event, as described in more detail below.

If the event is not associated with an equation (block 254), the method ends (block 270). If at least one equation is associated with the event (block 254), the character string representing the equation is parsed and tokenized (block 256) and saved as a tokenized equation. Thus the parsing and tokenizing is performed each time an event message is received. In other alternative embodiments, the character string is only parsed and tokenized when first created or when changed (optional block 255); if the character string is not new or has not changed, the previously saved tokenized equation for the event is used in blocks 258-264. Once any embedded variables within each token have been resolved (block 258), e.g., by retrieving the corresponding shared variable values from SV data 231, the equation is evaluated and the result saved (block 260). The result may take any of a number of forms, including but not limited to a numerical value, a logical value, a character value and an enumerated value. The result may be saved as an intermediate result for use by another equation, as a final result used to determine if an action should be taken, or both. Such results, whether intermediate or final, may be saved as a shared variable.

If it is determined that an action is needed (block 262) event processing software 234 initiates the required action (block 264). Once the action is initiated (block 264), or if no action is needed (block 262), event processing software 234 determines whether there are additional equations associated with the event. If not (block 266), method 250 ends (block 270). If more equations remain (block 266), the next equation is selected (block 268) and the process repeats (blocks 255-266) until no more equations remain that are associated with the event, ending the method (block 270).

Figure 3A:
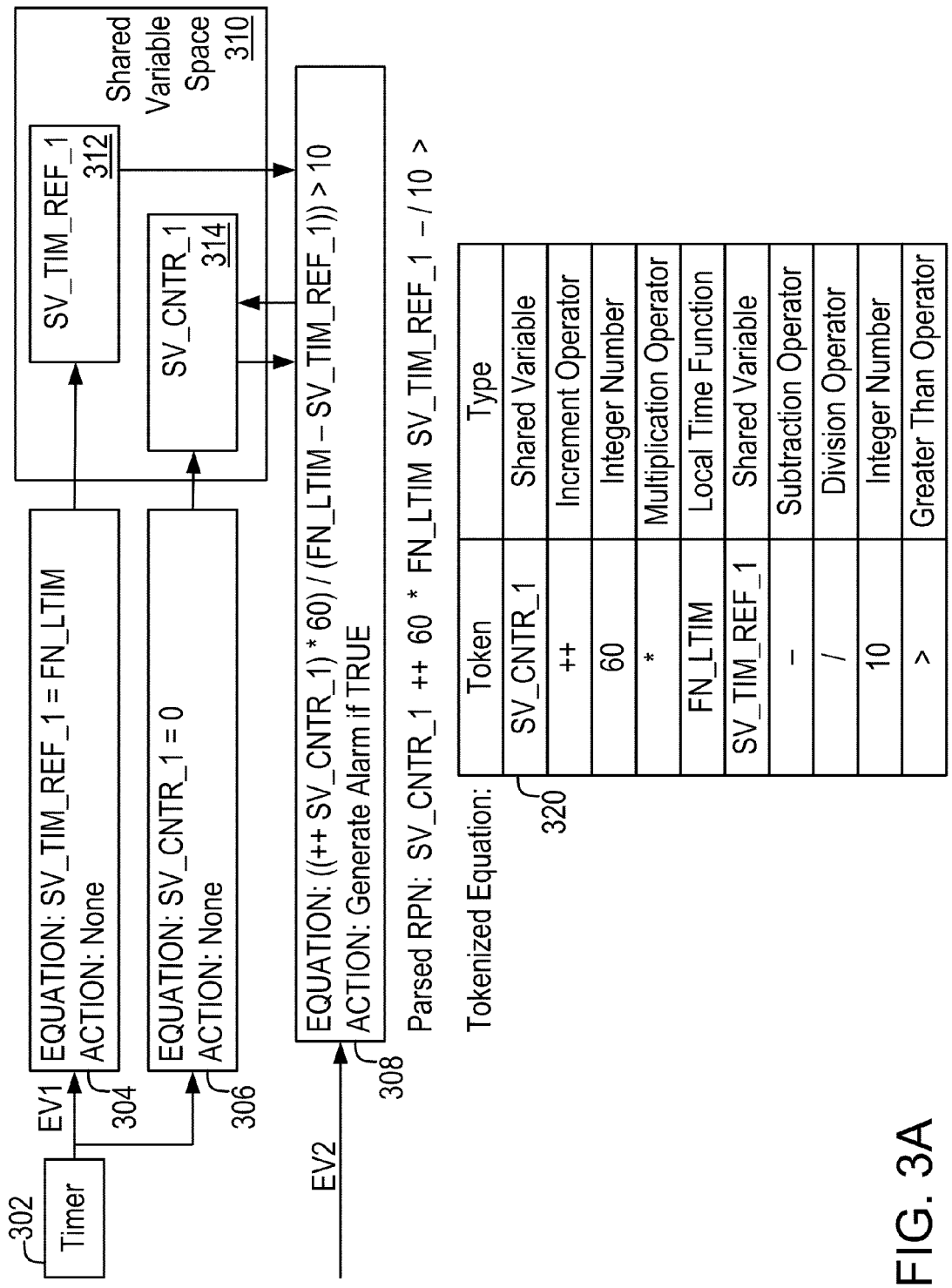
FIG. 3A illustrates an example of an equation and its parsed RPN and tokenized forms.

FIG. 3A illustrates an example that applies method 250 to a set of equations used to generate an alarm if an event occurs at a rate exceeding a threshold value. Three equations 304, 306 and 308 are created to support the desired rate calculation functionality. Two of the equations (302 and 304) are triggered by a periodic event message generated by timer 302. Timer 302 may be configured, for example, to generate event message EV1 once every minute. When the event message is detected, equation 304 saves the current local time (e.g., in seconds) as shared variable SV_TIM_REF_1 (312) and equation 306 clears event counter SV_CNTR_1 (314), another shared variable. Both shared variables 312 and 314 are stored within shared variable space 310 and may be accessed by other equations, as described in more detail below.

Equation 308 is triggered by event message EV2 and operates to determine the rate at which the event evinced by message EV2 has occurred within the most recent minute since event counter SV_CNTR_1 (314) was last zeroed. The event rate is calculated by incrementing the event counter 314, multiplying the incremented count by 60 (the number of seconds per minute) and dividing the result by the number of seconds transpired since the last counter reset. Because the event counter is reset, and the time reference used to calculate the elapsed time is updated, once every minute, the rate reflects the rate averaged over, at most, the last minute. In the example of FIG. 3, an alarm will be generated if the calculated rate is greater than 10 events per minute.

In at least some example embodiments, equation 308 is entered and stored as a character string (e.g., represented using infix notation), with the elements of the character string being distinguished by a separator (e.g., a blank space as shown in FIG. 3A). The parsed character string may then be converted when executed to reverse polish notation (RPN) using any of a number of algorithms known in the art (e.g., a shunting-yard algorithm to convert infix to RPN). RPN is used to represent the equation in at least some preferred embodiments, as the RPN representation can be executed more efficiently than, e.g., a corresponding parsed infix representation of the calculation. In at least some embodiments, the saved tokenized equation (described above) is stored in RPN form. Each RPN equation argument is operated upon in the order it appears on the execution stack (described in more detail below), with each operator and/or function using the number of immediately preceding arguments required, including the result of a previous operation and/or function. Throughout the remainder of the disclosure the term "function" is used to refer to both functions and operators, as it is generally understood in the art that operators are a class of functions.

The resulting RPN equation is further tokenized to identify each equation element as a shared variable, a number or a function, as shown in table 320 of FIG. 3A. The identification of data types, functions and variables may be implied, for example, by using prefixes (e.g., SV for shared variable and FN for function), by the absence or presence of a decimal point (e.g., 60 would be an integer number, but 60.0 would be a floating point number), or by the use of default typing for mixed mode expressions in the absence of express typing (e.g., all values are integer by default). In other example embodiments, data typing and variable and function identification may be explicit through the use of reserved keywords. Many other techniques for parsing and tokenizing character strings are well known in the art, and all such techniques are contemplated by the present disclosure.

Figure 3B:
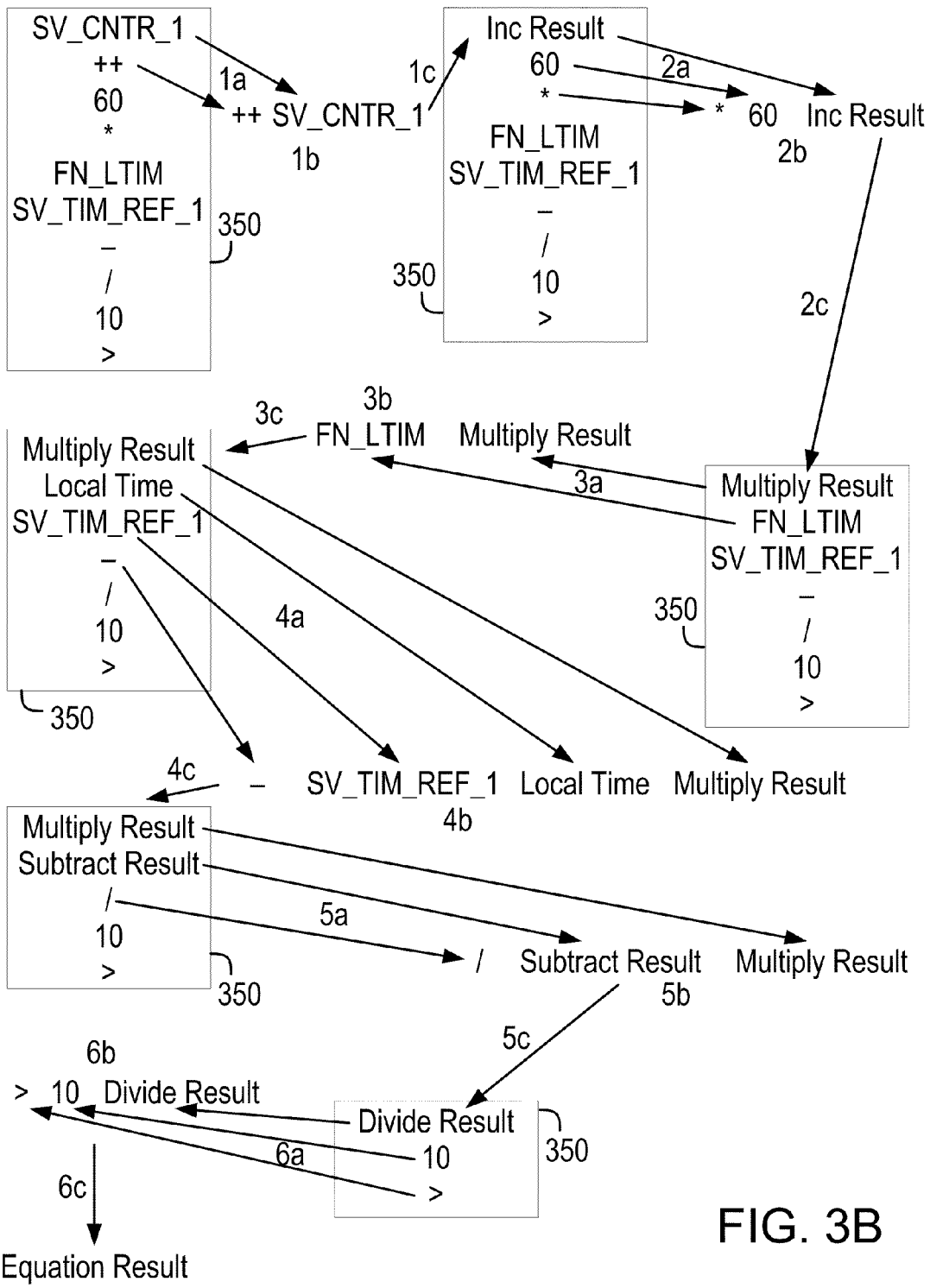
FIG. 3B illustrates an example of how the parsed RPN is processed using a stack.

As shown in FIG. 3B, the tokenized equation may be saved as a precedence-ordered linked list of tokens (token execution stack 350) that stores the tokens in reverse execution order (i.e., in RPN). Referring now to both FIGS. 3A and 3B, the parsed and tokenized RPN equation is executed as follows:

1. The shared variable SV_CNTR_1 is incremented by popping SV_CNTR_1 and the "++" operator off the stack, applying the operator to SV_CNTR_1, saving the result of the increment to the SV_CNTR_1 shared variable, and pushing the increment result onto the stack (1a-1c of FIG. 3B).
2. The result of the increment operation and the number 60 are multiplied by popping the increment result, the number 60 and the multiplication operator off the stack, applying the multiplication operator to the two arguments, and pushing the result of the multiply back onto the stack (2a-2c).
3. The local time in seconds is retrieved by popping the multiply result and the FN_LTIM function off the stack, calling the function and pushing the local time and the multiply result back on the stack (3a-3c).
4. The shared variable SV_TIM_REF_1 is subtracted for the retrieved local time by popping the multiply result, retrieved time, SV_TIM_REF value (previously resolved in block 258 of method 250) and the "−" operator from the stack, applying the subtraction operator to the two arguments, and pushing the subtract result and the multiply result back onto the stack (4a-4c).
5. The multiply result is divided by the divide result by popping the multiply and subtract results and the "/" operator from the stack, applying the division operator to the two arguments, and pushing the divide result back onto the stack (5a-5c).
6. The divide result (the calculated rate) and the number 10 are compared to determine if the calculated rate is greater than the coded threshold (10 events per minute) by popping the divide result, the number 10 and the ">" operator from the stack, applying the greater than operator to the two arguments, and saving the comparison result as the result of the equation, either TRUE or FALSE (6a-6c).

If the result of the final comparison is TRUE, an alarm is generated, for example, at an operator console to notify the operator that the event rate threshold has been exceeded.

Figure 4:
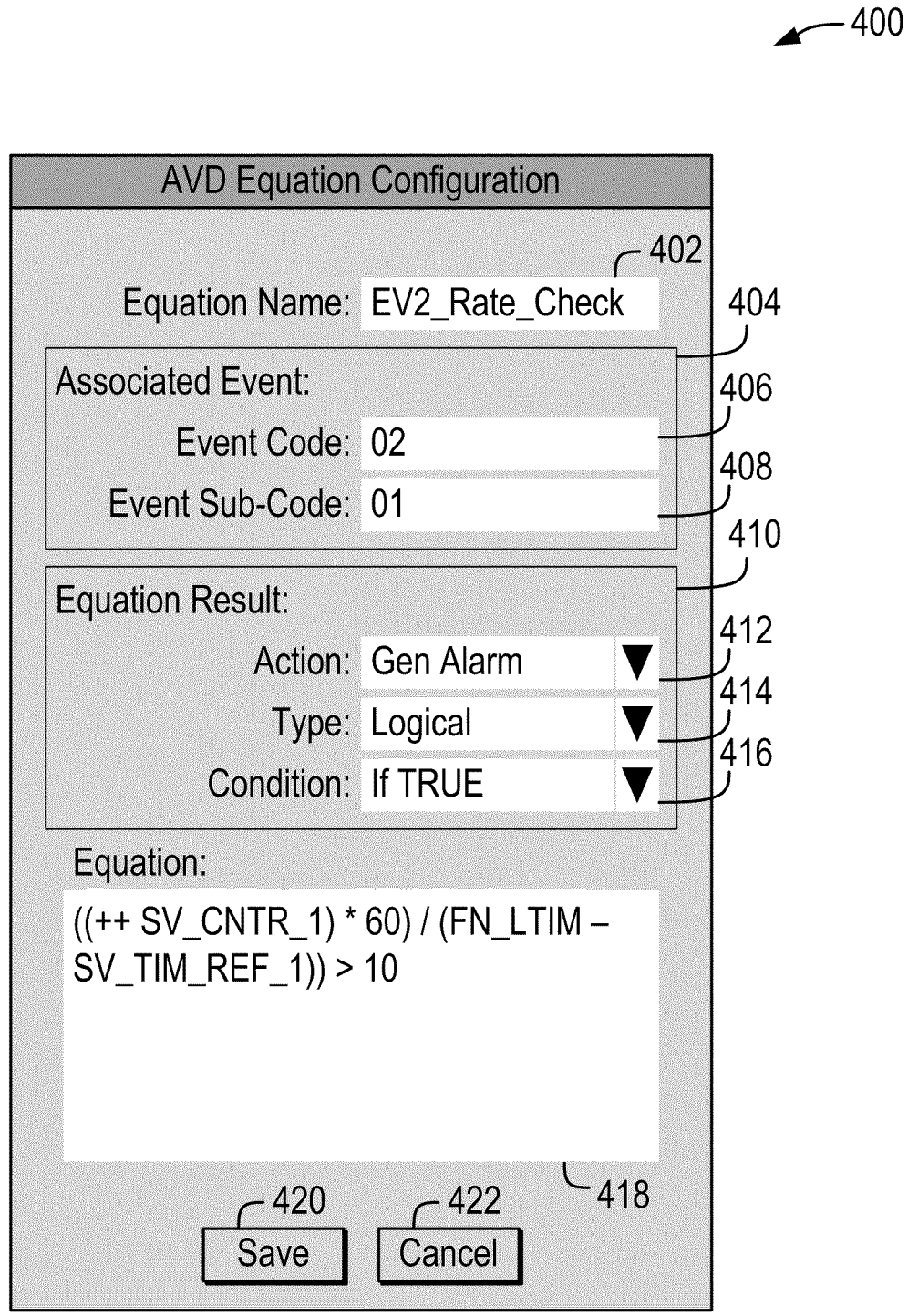
FIG. 4 illustrates an example AVD equation configuration window.

FIG. 4 illustrates an example embodiment of a data entry window 400 for creating and/or updating equation 308 of FIG. 3. The window includes entry fields for an equation name 402 to uniquely identify the equation, as well as event code 406 and sub-code 408 that together operate to identify associated event 404, which triggers execution of the equation. Equation result 410 includes three drop-down select boxes including action 412, which selects the action (if any) to be performed, result type 414, which specifies the data type of the result of the equation, and condition 416 which is the condition that must be met in order for action 412 to be performed. The window also includes equation entry field 418 for entering the ASCI representation of the equation, and save and cancel buttons 420 and 422 for saving the equation or changes to the equation, or for closing the data entry window without saving the equation or changes.

While any number of actions, types and conditions are possible, examples of an action may include generating an alarm, executing one of selection of commands directed to a source of the event, and triggering execution of a command procedure to perform the action; examples of types include, but are not limited to, logical, integer, floating point and character data types. Examples of conditions include, but are not limited to, if true, if false, if non-zero, if zero, if greater than, if less than and if equal. Many other examples of actions, types and conditions will become apparent to those or ordinary skill in the art, and all such actions, types and conditions are contemplated by the present disclosure.

By accepting entry of an equation as a character string that is subsequently parsed and tokenized, a user is allowed to create free-form equations that combine the available functions in any manner desired. Such a broad level of combinations is enabled by implementing each function, as well as the parser and tokenizer, as separate software modules within one or more libraries (e.g., as one or more UNIX shared libraries or Windows DLLs). Because each function is implemented as a separate module that produces a single result, the result of most or all functions may be used as an argument to most or all other functions. This avoids having to provide hard-coded solutions within event processing software 234 of FIG. 2A for each possible combination of functions. Further, the use of a separate library also avoids having to update event processing software 234 each time a new function is provided or whenever an existing function is updated. Instead, updated versions of the library are distributed. Because the parser accepts as input the unparsed character representation of an equation, the interface to the library remains unchanged.

In the examples described herein, event messages are used to trigger the calculation of an equation. However, in other embodiments event messages may also include one or more numerical values that may be used as part of the equation calculation. For example, if an event message is received indicating a high temperature threshold has been exceeded, one or more equations may be defined that trigger different actions depending upon the actual temperature value included within the event message. Those of ordinary skill in the art will recognize that many other numerical values embedded within an event message may be used as part of a equation calculation, and all such values and calculations are contemplated by the present disclosure.

Further, although the equation calculations described herein as part of event processing software 234 are presented as an alternative to the use of command procedures, the systems and methods described herein do not preclude the use of such command procedures either separately from, or in concert with, the claimed systems and methods. Thus, for example, an action taken as a result of meeting a condition of an equation may be the execution of a command procedure. While this would incur the overhead associated with a command procedure, such overhead would be incurred less frequently. This is due to the fact that the above-described free-form format of the equations provides enough flexibility as to generally preclude the need for further event processing by a command procedure, limiting the need for their use to a limited number of special cases.

Figure 5:
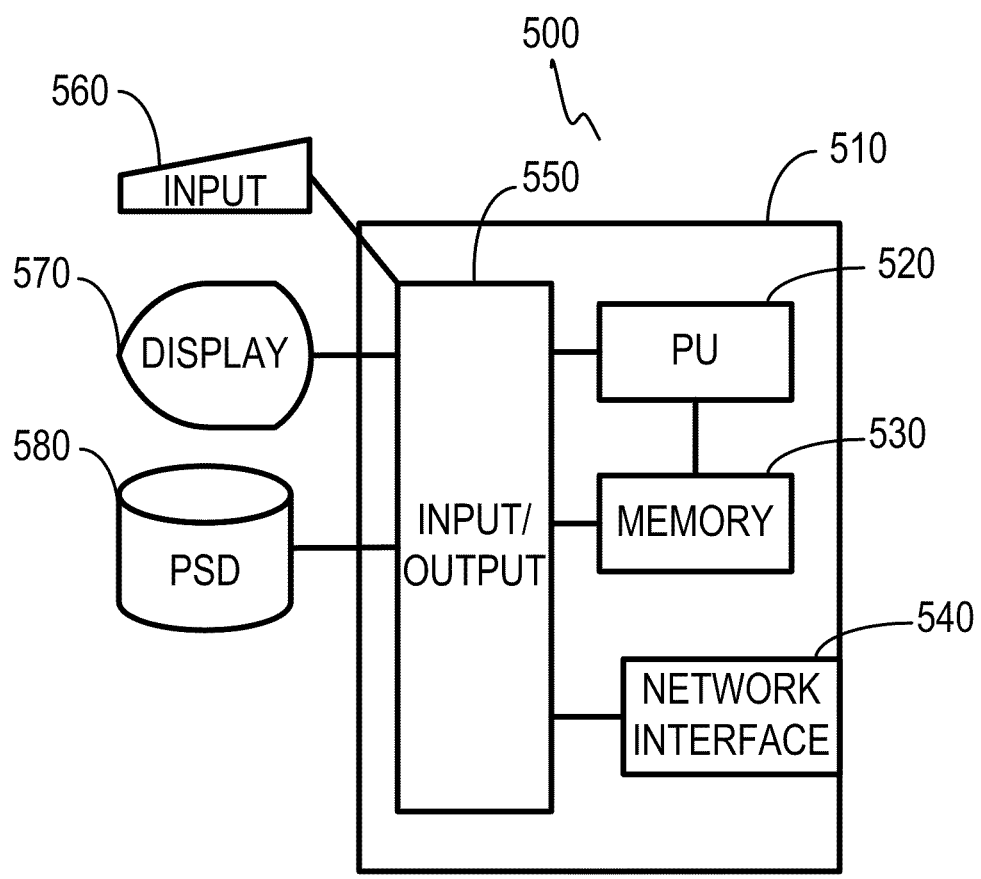
FIG. 5 illustrates an example of a computer system suitable for executing software that performs at least some of the functionality described herein.

Referring now to FIG. 5, an example computer system 500 is shown that may be used as a management station, such as virtual machine 230c of FIG. 2A, or as any other virtual or real computer system shown in the figures and described herein. Example computer system 500 may include a programmable control device 510 which may be optionally connected to input 560 (e.g., a keyboard, mouse, touch screen, etc.), display 570 or non-volatile/persistent storage device (PSD) 580 (sometimes referred to as direct access storage device DASD). Also, included with programmable control device 510 is a network interface 540 for communication via a network with other computing and corporate infrastructure devices (see, e.g., network 202 of FIG. 2A). Note that network interface 540 may be included within programmable control device 510 or be external to programmable control device 510. In either case, programmable control device 510 will be communicatively coupled to network interface 540. Also note that non-volatile storage unit 580 represents any form of non-volatile storage including, but not limited to, all forms of optical, magnetic and solid-state storage elements.

Programmable control device 510 may be included in a computer system and be programmed to perform methods in accordance with this disclosure (e.g., method 250 illustrated in FIG. 2B). Programmable control device 510 includes a processing unit (PU) 520, input-output (I/O) interface 550 and memory 530. Processing unit 520 may include any programmable controller device including, for example, processors of an IBM mainframe (such as a quad-core z10 mainframe microprocessor). Alternatively, in non mainframe systems, examples of processing unit 520 include the Intel Core®, Pentium® and Celeron® processor families from Intel and the Cortex® and ARM® processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 530 may include one or more memory modules and include random access memory (RAM), read only memory (ROM), programmable read only memory (PROM), programmable read-write memory, and solid state memory. One of ordinary skill in the art will also recognize that PU 520 may also include some internal memory including, for example, cache memory.

In addition, acts in accordance with the method of FIG. 2B may be performed by an example computer system 500 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium," "computer-usable medium" or "computer-readable storage medium," are suitable for tangibly embodying program instructions and may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as network 202 and/or a wireless link.

Although the examples described include software executing on individual, self-contained physical computers, software that implements the functionality described herein is not limited to such physical computers. Those of ordinary skill in the art will recognize that other computer system implementations may be suitable for executing software that implements at least some of the functionality described herein (e.g., EP S/W 234 of FIG. 2A). These implementations may include virtualized computer systems (e.g., systems implemented using z/VM virtual machine operating system software by IBM), and distributed computer systems (e.g., diskless workstations and netbooks), just to name a few examples. All such implementations and variations of a computer system are contemplated by the present disclosure.

The above discussion is meant to illustrate the principles of at least some example embodiments of the claimed subject matter. Various features are occasionally grouped together in a single embodiment for the purpose of streamlining the disclosure. This method of disclosure is not to be interpreted as reflecting an intention that the embodiments of the claimed subject matter require more features than are expressly recited in each claim.

Various changes in the details of the illustrated operational methods are possible without departing from the scope of the claims that follow. For instance, illustrative flow chart steps or process steps of FIG. 2B may perform the identified steps in an order different from that disclosed here. Alternatively, some embodiments may combine the activities described herein as being separate steps. Similarly, one or more of the described steps may be omitted, depending upon the specific operational environment the method is being implemented in.

Other variations and modifications will become apparent to those of ordinary skill in the art once the above disclosure is fully appreciated. For example, although the embodiments described and illustrated only include a single event associated with an equation, other example embodiments may provide for associating multiple events with each equation. Further, although shown as a single software module, the event processing software described may also be implemented as two or more separate software modules that communicate with each other (e.g., using shared memory or inter-process communication (IPC) mechanisms). Also, although some embodiments are described as utilizing EBCDIC representations of character strings, other string representations (e.g. ASCII) may also be used and are contemplated by the present disclosure. It is intended that the following claims be interpreted to include all such variations and modifications.

What is claimed is:

1. A management station for managing events that occur in a group of computer machines under a framework in which results of one or more equations associated with an event determine if an action is to be carried out in response to the event, the management station comprising:
 a communication interface configured to receive one or more event messages; and
 a processing unit coupled to the communication interface, wherein the processing unit includes an advanced variable dependency module and a shared variable data store, wherein the advanced variable dependency module is configured to:
 in response to receiving an event message,
  determine if the event is associated with one or more equations; and
 for at least one equation associated with the event,
  parse and tokenize a character string representing the equation, the character string comprising one or more delimited elements selected from the group consisting of a constant, a variable and a function, wherein each function accepts as input the one or more delimited elements;
  save the parsed and tokenized character string as a tokenized equation, wherein the tokenized equation identifies each equation element as a shared variable, a number or a function;
  retrieve corresponding shared variable values from the shared variable data store for evaluating the tokenized equation;
  evaluate the tokenized equation to calculate an equation result;
  save the equation result in the shared variable data store; and
  determine, based on the equation result, if an action should be initiated in response to the event.

2. The management station of claim 1, wherein the advanced variable dependency module is configured to save the equation result in the shared variable data store as one of a numerical value, a logical value, a character value and an enumerated value.

3. The management station of claim 1, wherein the processing unit is configured, in response to receiving the event message, to use a previously saved tokenized equation for the event.

4. The management station of claim 1, wherein the processing unit performs the parsing and tokenizing in response to creation or modification of the character string.

5. The management station of claim 1, wherein each function is implemented by separate software modules included within a library.

6. The management station of claim 1, wherein the advanced variable dependency module is configured to save the equation result in the shared variable data store as an intermediate result for use by one or more additional equations associated with the event.

7. The management station of claim 1, wherein the function comprises an operator.

8. The management station of claim 1, wherein the variable comprises a shared variable.

9. The management station of claim 1, wherein the character string describes a user-defined equation using infix notation, and wherein the processing unit further converts the character string to a reverse polish notation representation of the user-defined equation.

10. The management station of claim 9, wherein each token is included within a precedence-ordered linked list.

11. The management station of claim 9, wherein the processing unit parses the formula using a shunting-yard algorithm.

12. A method for processing events from a plurality of computer systems coupled to a management station, the method comprising:
receiving an event message at the management station;
identifying an equation associated with the event;
obtaining a character string for the equation associated with the event at the management station, the character string comprising one or more delimited elements selected from the group consisting of a constant, a variable and a function, wherein each function accepts as input the one or more delimited elements;
parsing and tokenizing the character string for the equation associated with the event at the management station;
saving the parsed and tokenized character string as a tokenized equation, wherein the tokenized equation identifies each equation element as a shared variable, a number or a function;
retrieving corresponding shared variable values from a shared variable data store for evaluating the tokenized equation;
evaluating the tokenized equation to calculate an equation result;
saving the equation result in the shared variable data store; and
determining, based on the equation result, if an action should be initiated in response to the event.

13. The method of claim 12, wherein the character string comprises an EBCDIC string or an ASCII string.

14. The method of claim 12, wherein the obtaining, parsing and tokenizing are performed in response to the act of receiving.

15. The method of claim 12, wherein the obtaining, parsing and tokenizing are performed in response to creating or modifying the character string.

16. The method of claim 12, wherein each function is implemented by separate software modules included within a library.

17. The method of claim 16, wherein the library comprises a shared library or a dynamic link library.

18. The method of claim 12, wherein the function comprises an operator.

19. The method of claim 12, wherein the variable comprise a shared variable.

20. The method of claim 12, wherein the character string describes a user-defined equation using infix notation, and wherein the parsing converts the character string to a reverse polish notation representation of the user-defined equation.

21. The method of claim 20, wherein each token is included within a precedence-ordered linked list.

22. The method of claim 20, wherein the parsing comprises using a shunting-yard algorithm.

23. A non-transitory computer-readable storage medium bearing executable code, which code when executed by one or more processors cause a management station for processing events from a plurality of computer systems to:
receive an event message;
identify an equation associated with the event;
obtain a character string for the equation associated with the event, the character string comprising one or more delimited elements selected from the group consisting of a constant, a variable and a function, wherein each function accepts as input the one or more delimited elements;
parse and tokenize the character string for the equation associated with the event at the management station;
save the parsed and tokenized character string as a tokenized equation, wherein the tokenized equation identifies each equation element as a shared variable, a number or a function;
retrieve corresponding shared variable values from the shared variable data store for evaluating the tokenized equation;
evaluate the tokenized equation to calculate an equation result;
save the equation result in the shared variable data store; and
determine, based on the equation result, if an action should be initiated in response to the event.

24. A networked computer system, comprising:
one or more monitored systems each configured to transmit one or more event messages;
a communication network that couples the one or more monitored systems to each other and a management station,
wherein the management station is configured to:
receive an event message;
identify an equation associated with the event;
obtain a character string for the equation associated with the event, the character string comprising one or more delimited elements selected from the group consisting of a constant, a variable and a function, wherein each function accepts as input the one or more delimited elements;
parse and tokenize the character string for the equation associated with the event at the management station;
save the parsed and tokenized character string as a tokenized equation, wherein the tokenized equation identifies each equation element as a shared variable, a number or a function;
retrieve corresponding shared variable values from a shared variable data store for evaluating the tokenized equation;
evaluate the tokenized equation to calculate an equation result;
save the equation result in the shared variable data store; and
determine, based on the equation result, if an action should be initiated in response to the event.

25. The networked computer system of claim 24, wherein the character string comprises an EBCDIC string or an ASCII string.

26. The networked computer system of claim 24, wherein the management station performs the obtaining, parsing and tokenizing in response to receiving the event message.

27. The networked computer system of claim 24, wherein the management station performs the obtaining, parsing and tokenizing in response to creation or modification of the character string.

28. The networked computer system of claim 24, wherein each function is implemented by separate software modules included within a library.

29. The networked computer system of claim 28, wherein the library comprises a shared library or a dynamic link library.

30. The networked computer system of claim 24, wherein the function comprises an operator.

31. The networked computer system of claim 24, wherein the variable comprises a shared variable.

32. The networked computer system of claim 24, wherein the character string describes a user-defined equation using infix notation, and wherein the processing unit further converts the character string to a reverse polish notation representation of the user-define equation.

33. The networked computer system of claim 32, wherein each token is included within a precedence-ordered linked list.

34. The networked computer system of claim 32, wherein the management station parses the formula using a shunting-yard algorithm.

* * * * *